INVENTOR
WILLIAM K. WILKINSON

BY Eugene Berman

AGENT

United States Patent Office 3,539,524
Patented Nov. 10, 1970

3,539,524
COLOR STABILIZER FOR ACRYLONITRILE POLYMER
William K. Wilkinson, Waynesboro, Va., assignor to E. I. du Pont de Nemours and Company, Wilmington, Del., a corporation of Delaware
Filed May 15, 1968, Ser. No. 729,341
Int. Cl. C08g 51/44, 51/60
U.S. Cl. 260—32.6       5 Claims

ABSTRACT OF THE DISCLOSURE

The color development in acrylonitrile polymer solutions is effectively inhibited by the addition of a citric acid/succinic anhydride mixture to the solvent medium. Such compositions are well adapted for forming fiber of low color.

---

Figure 1:
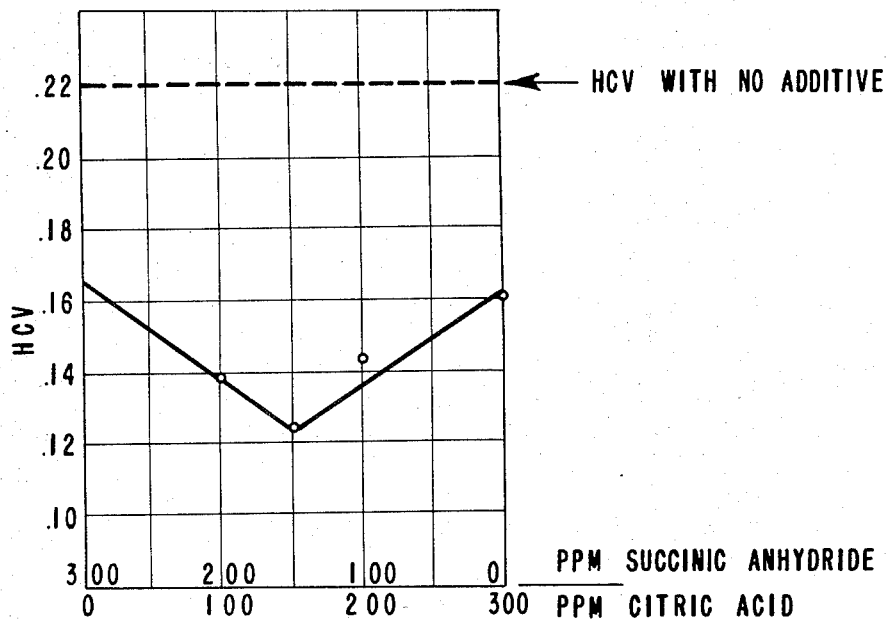

This invention relates to inhibiting the development of color in acrylonitrile polymers when they are dissolved in suitable solvents, and particularly to inhibiting the development of color in acrylonitrile polymers when they are dry-spun from hot solution so that the resulting acrylic fibers will be of low color.

BACKGROUND OF THE INVENTION

When acrylonitrile polymers are dissolved by heating them in suitable solvents, and particularly when the resulting solutions are heated to high temperature and maintained hot for a considerable period of time, a yellow or brownish-yellow color develops in the solution. When the solution is subsequently dry-spun to form acrylic fibers, most of the solvent is flashed off in the spinning cell and the remainder is extracted during hot aqueous processing of the spun fiber. The discoloration developed in the spinning solution persists and is observed therein; the acrylic fiber products, spun from such solutions, have an undesirable off-white color.

It has been proposed to add various substances to solutions of acrylonitrile polymer to slow down the rate of discoloration of the polymer when it is heated in solution. B. M. Pettyjohn, in his U.S. Pat. 3,383,350 monitors the solution color and employs diethylenetriaminepentaacetic acid or citric acid as a solution additive to maintain the color of the solution at a predetermined level. R. R. Holmes et al., consisting of sulfamic acid, phosphoric acid, oxalic acid, tartaric acid, and citric acid in combination with an organic metal sulfoxylate and an inorganic acid having an ionization constant greater than $1 \times 10^{-4}$. R. A. Scheiderbauer, in his U.S. Pat. 2,502,030, discloses inhibition of color formation in acrylonitrile polymer solutions by adding acids such as oxalic acid, vinyl sulfonic acid, or sulfuric acid; anhydrides such as succinic anhydride and phthalic anhydride; acid chlorides such as p-toluenesulfonyl chloride; aldehydes and ketones such as isobutyraldehyde and cyclohexanone; and other compounds such as boron trifluoride. While such additives do reduce the level of color in the acrylonitrile polymer solution, the effectiveness of color inhibitors known hitherto is limited, and there has been a continuing desire for more effective inhibitors.

SUMMARY OF THE INVENTION

In accordance with this invention, a composition is provided comprising acrylonitrile polymer dissolved in a non-aqueous solvent medium together with at least about 100 parts per million (p.p.m.), based upon the total composition, of a citric acid/succinic anhydride mixture in a 9/1 to 1/4 weight ratio.

The acrylonitrile polymer and the citric acid/succinic anhydride mixture are added to the non-aqueous solvent medium thereby effectively inhibiting the subsequent development of color when the resulting solution is heated. Surprisingly, a synergistic effect between citric acid and succinic anhydride is observed; and the color of the acrylonitrile polymer solution of the invention, when heated, is markedly lower than the color of corresponding solutions containing either citric acid alone or succinic anhydride alone in amounts ranging up to the combined weight of the synergistic mixture and even higher. The solution of acrylonitrile polymer provided by the invention is well adapted for the dry spinning of acrylic fibers of low color.

PREFERRED EMBODIMENTS

In a preferred embodiment of the invention, the mixture of citric acid and succinic anhydride is added to the non-aqueous solvent before the acrylonitrile polymer is added to the non-aqueous solvent. Although the mixture of citric acid and succinic anhydride may be added to the solution of acrylonitrile polymer in the non-aqueous solvent to inhibit color development, this procedure is less desirable since color already developed frequently is not eliminated.

It is preferred that the solution contain no more than about 2000 p.p.m. of the mixture of citric acid and succinic anhydride, since higher amounts do not lead to reduced color of the solution. It is also preferred that the ratio between citric acid and succinic anhydride be in the range of from 3/2 to 2/3.

Non-aqueous solvents suitable for dissolving acrylonitrile polymer are well known in the art. Among such solvents are N - N - dimethylformamide, N - N - dimethylacetamide, dimethyl sulfoxide, tetramethylene sulfone, α-butyrolactone, ethylene carbonate, and others. The solvents should be substantially anhydrous, i.e., containing not more than about 0.2% water by weight. The preferred solvents in which the acrylonitrile polymer is dissolved are dimethylamides containing not more than a total of 4 carbon atoms.

A highly preferred product provided by the present invention is a solution of an acrylonitrile polymer in dimethylformamide, said solution containing from about 100 p.p.m. to 500 p.p.m. of a mixture of citric acid and succinic anhydride in a ratio ranging from 3/2 to 2/3. The solution preferably contains from about 25 to 60 weight percent acrylonitrile polymer, preferably having an intrinsic viscosity (as described hereinafter) of at least about 0.5 (most preferably at least about 0.7).

DEFINITIONS AND MEASUREMENTS

*Acrylonitrile polymer*, as used herein, refers to any long chain synthetic polymer composed of at least 85% by weight of acrylonitrile units of the formula,

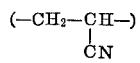

in the polymer chain. As is well understood, the term includes both the homopolymer of acrylonitrile and copolymers of acrylonitrile and monoethylenically unsaturated monomers polymerizable with acrylonitrile. Non-limitative examples of preferred comonomers include methyl acrylate, methyl methacrylate, vinyl acetate, styrene, methacrylamide, methacrylonitrile, vinyl chloride, vinylidene chloride, methyl vinyl ketone, 2-vinylpyridine, 4-vinyl-pyridine, 2-methyl-5-vinylpyridine, and sodium styrene sulfonate. Preparation of these polymers is well known, such processes being disclosed in U.S. Pats. 2,486,241; 2,456,238; 2,837,500; and 2,837,501 as well as many other patents.

*Intrinsic Viscosity* is defined by the formula $$\left[\frac{\ln Nr}{C}\right]_{C \to 0}$$

in which Nr (relative viscosity) is the viscosity of a dilute solution of the polymer in dimethylformamide divided by the viscosity of dimethylformamide in the same units and at the same temperature (i.e., 25° C.). C is the concentration in grams of polymer per 100 cc. of solution. As the formula indicates, intrinsic viscosity is defined as the limit as the concentration approaches zero. Inherent viscosity (which is defined by the above formula when C is above zero) is generally a good approximation of intrinsic viscosity at low concentration (e.g., 0.2 g./100 cc.).

*Heated color value* (HCV) is the optical density of an acrylonitrile polymer solution measured as follows. A dimethylformamide solution containing a predetermined amount of citric acid and succinic anhydride is prepared. 2.0 grams of acrylonitrile polymer is placed into a tube having a screw cap, after which the tube is alternately shaken and flushed three times with nitrogen to desorb any air which may be present. 6.4 milliliters of the dimethylformamide solution is then added, and the tube is blanketed with nitrogen. The tube is heated, forming a solution of 25% solids, and heating of the closed tube under a nitrogen blanket is continued for 90 minutes at 125° C. The solution is then diluted to 5.8% solids with dimethylformamide and the optical density of the solution is measured on a spectrophotometer at 400 m$\mu$, using a sample of the dimethylformamide solvent containing no solids as a reference. The measured optical density is designated as the heated color value (HCV).

*Percentage improvement in HCV* is defined as the ratio, expressed as a percentage, of the number of HCV units of color difference between the control solution with no additive and the additive-containing solution, and the number of HCV units observed in the additive-containing solution. It is defined by the following equation:

Percentage improvement in $$HCV = \frac{(HCV)_0 - (HCV)_a}{(HCV)_a} \times 100\%$$

where $(HCV)_0$ is the heated color value of the control solution with no additive and $(HCV)_a$ is the heated color value of the additive-containing solution.

EXAMPLE

The preferred embodiments of the invention will be illustrated by the example that follows. Parts and percentages are by weight unless otherwise indicated.

EXAMPLE

In a series of experiments, solutions of acrylonitrile/methyl acrylate (94/6 weight percent) copolymer having an intrinsic viscosity of 1.2 are prepared in accordance with the following procedure. A dimethylformamide solution having the concentrations of citric acid and succinic anhydride indicated in Table I is first prepared and the acrylonitrile/methyl acrylate polymer is added thereto. The HCV of each of the polymer solutions is shown in the table. Data for a control solution of the copolymer containing neither citric acid nor succinic anhydride is given first (item A), followed by data for control solutions of the copolymer containing varying concentrations of citric acid and succinic anhydride separately (items B and C). Data relating to solutions of the copolymer containing a mixture of citric acid and succinic anhydride in accordance with the invention are given under items D and E of the table at concentrations of 300 and 500 p.p.m., respectively. The percentage improvement in HCV is also given in Table I.

TABLE I.—EFFECT OF ADDITIVES ON HEATED COLOR VALUES OF ACRYLONITRILE/METHYL ACRYLATE COPOLYMER SOLUTIONS IN DIMETHYLFORMAMIDE

| Item | | Citric acid, p.p.m. | Succinic anhydride, p.p.m. | HCV | Percentage HCV improvement |
|---|---|---|---|---|---|
| (A) | Control: no additive | | | .221 | |
| (B) | Control: citric acid alone | 50 | | .194 | 14 |
| | | 100 | | .174 | 27 |
| | | 200 | | .157 | 41 |
| | | 400 | | .164 | 35 |
| (C) | Control: succinic anhydride alone | | 500 | .160 | 38 |
| (D) | 300 p.p.m. total of citric acid and succinic anhydride | 100 | 200 | .139 | 59 |
| | | 150 | 150 | .124 | 78 |
| | | 200 | 100 | .144 | 53 |
| | | 50 | 450 | .174 | 27 |
| (E) | 500 p.p.m. total of citric acid and succinic anhydride | 100 | 400 | .143 | 55 |
| | | 200 | 300 | .124 | 78 |
| | | 350 | 150 | .134 | 65 |
| | | 450 | 50 | .140 | 58 |

Figure 2:
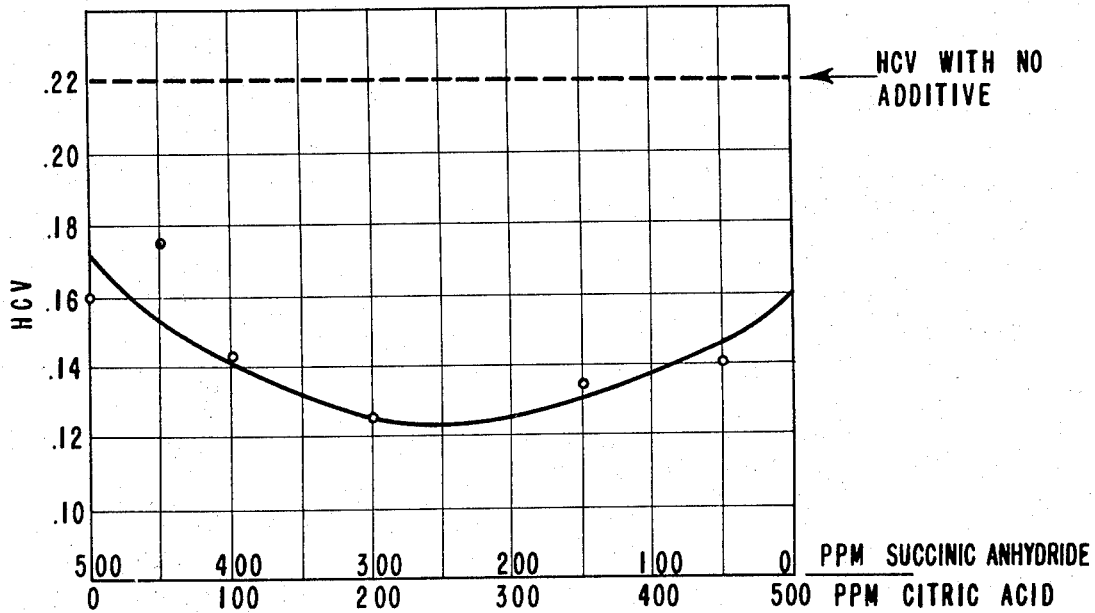

The data of item D is plotted as a graph in FIG. 1. The HCV value of 0.16 for 300 p.p.m. citric acid with no succinic anhydride present is interpolated from item B. The data of item E is plotted as a graph in FIG. 2.

As this data indicates, a synergistic effect between citric acid and succinic anhydride exists and the color of the acrylonitrile polymer solution, when heated, is markedly lower than the color of corresponding solutions containing no additive, or either citric acid alone or succinic anhydride alone in amounts ranging up to the combined weight of the synergistic mixture and even higher.

Acrylonitrile/methyl acrylate copolymer solutions having the composition of the three entries of item D and the last four entries of item E in the above table can be dry-spun readily by conventional methods to form acrylic fibers of excellent low color.

To determine whether succinic anhydride used in combination with diethylenetriaminepentaacetic acid (DTPA) exhibits a synergistic color-inhibiting effect, solutions of acrylonitrile/methyl acrylate (94/6 weight percent) copolymer having an intrinsic viscosity of 1.0 are prepared in accordance with the general procedure of the example above. Four solutions are prepared containing, respectively, (a) no additive, (b) DTPA alone, (c) succinic anhydride alone, and (d) a mixture of DTPA and succinic anhydride. The results are as shown in Table II.

TABLE II

| Item | DTPA, p.p.m. | Succinic anhydride, p.p.m. | HCV | HCV improvement, percent |
|---|---|---|---|---|
| (a) Control: no additive | | | .34 | |
| (b) DTPA alone | 100 | | .27 | 25 |
| (c) Succinic anhydride alone | | 400 | .25 | 36 |
| (d) DTPA/succinic anhydride | 100 | 400 | .31 | 10 |

As shown by the above results, the combination of DTPA and succinic anhydride does not give a synergistic mixture; in fact, the mixture appears less effective than either color inhibitor used alone.

What is claimed is:

1. A composition comprising about 5.8 to 60% by weight acrylonitrile polymer dissolved in a non-aqueous solvent medium containing at least about 100 parts per million, of a citric acid/succinic anhydride mixture in a 9/1 to 1/4 weight ratio, said percentage and parts being based on the total composition.

2. Composition of claim 1 comprising less than about 2000 parts per million of said citric acid/succinic anhydride mixture.

3. Composition of claim 1 comprising less than about 2000 parts per million of said citric acid/succinic anhydride mixture is a 3/2 to 2/3 weight ratio.

4. Composition of claim 1 wherein said non-aqueous solvent medium is a dimethylamide containing not more than a total of 4 carbon atoms.

5. Composition of claim 1 wherein said non-aqueous solvent medium is N-N dimethylformamide.

References Cited

UNITED STATES PATENTS

| | | | |
|---|---|---|---|
| 2,502,630 | 3/1950 | Scheiderbauer | 260—47.85 X |
| 2,878,206 | 3/1959 | Holmes | 260—47.8 X |

MORRIS LIEBMAN, Primary Examiner

RICHARD ZAITLER, Assistant Examiner

U.S. Cl. X.R.

260—47.8; 47.85